United States Patent [19]

Thaler et al.

[11] 4,376,102
[45] Mar. 8, 1983

[54] PROCESS FOR REMOVING ACID GASES USING A BASIC SALT ACTIVATED WITH A DIAMINOALCOHOL

[75] Inventors: Warren A. Thaler, Aberdeen; Guido Sartori, Linden; Chang J. Kim, Somerset, all of N.J.

[73] Assignee: Exxon Research and Engineering Co., Florham Park, N.J.

[21] Appl. No.: 326,596

[22] Filed: Dec. 2, 1981

[51] Int. Cl.³ .................... B01D 53/34; C09K 3/00
[52] U.S. Cl. .................................. 423/223; 423/226; 423/228; 423/232; 423/234; 252/189; 252/190; 252/192
[58] Field of Search ............. 423/223, 226, 228, 229, 423/232, 234; 252/189, 190, 192

[56] References Cited

U.S. PATENT DOCUMENTS 4,094,957  6/1978  Sartori et al. .................... 423/223
4,112,050  9/1978  Sartori et al. .................... 423/223

FOREIGN PATENT DOCUMENTS 317227  8/1974  Austria .

OTHER PUBLICATIONS

Sandberg, R. et al., *Acta. Pharm. Suec.* 16, 386–395, (1979), especially p. 389.
Hampshire, J. et al., *J. Med. Chem.*, 11, 583–588, (1968).

*Primary Examiner*—Earl C. Thomas
*Attorney, Agent, or Firm*—Janet E. Hasak

[57] ABSTRACT

Acidic gases containing carbon dioxide are removed from a normally gaseous mixture by absorbing $CO_2$ from the gaseous mixture with an aqueous solution comprising a basic alkali metal salt or hydroxide and an activator or promoter system for the salt or hydroxide which contains (i) at least one diaminoalcohol of the formula:

$$H_2N-(CH_2)_4-NRR'$$

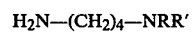

wherein R and R' each independently represent a $C_1$–$C_6$ alkyl group and either R or R' or both R and R' have a pendant hydroxyl group, and (ii) an amino acid, and desorbing at least partially the absorbed $CO_2$ from the aqueous solution.

15 Claims, No Drawings

PROCESS FOR REMOVING ACID GASES USING A BASIC SALT ACTIVATED WITH A DIAMINOALCOHOL

BACKGROUND OF THE INVENTION

1. Field of the Invention

The present invention relates to use of a specific class of diaminoalcohols in admixture with an amino acid as cosolvent therefor in an aqueous absorbing solution for "hot pot" type acid gas scrubbing processes.

2. Description of Related Patents

Recently, it was shown in U.S. Pat. No. 4,112,050 that sterically hindered amines are superior to diethanolamine (DEA) as promoters for alkaline salts in the "hot pot" acid gas scrubbing process. U.S. Pat. No. 4,094,957 describes an improvement to this process whereby amino acids, particularly sterically hindered amino acids, serve to prevent phase separation of the aqueous solution containing sterically hindered amines at high temperatures and low fractional conversions during the acid gas scrubbing process.

While combinations of sterically hindered diamines such as N-cyclohexyl propanediamine (CHPD) with a cosolvent such as pipecolinic acid represent preferred activator systems in U.S. Pat. No. 4,094,957 for promoting hot carbonate $CO_2$ scrubbing operations, there are certain disadvantages associated therewith. One difficulty is that sterically hindered primary-secondary diamines such as CHPD are unstable in the presence of $CO_2$ and tend to enter into undesirable intramolecular condensation reactions therewith to form a cyclic urea precipitate, which reactions are catalyzed by any $H_2S$ present in the gaseous system. The side reaction of CHPD with $CO_2$ can be represented as follows:

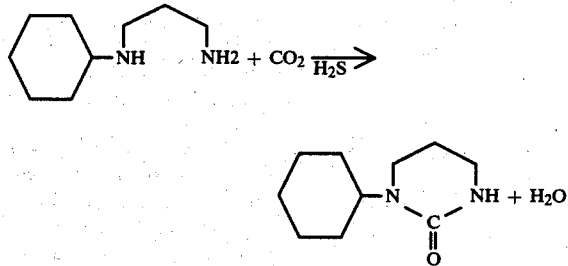

Not only is the diamine consumed by this reaction, but the insoluble cyclic urea must be removed from the system to avoid congestion of the plant operation. Another drawback is that many sterically hindered diamines are highly volatile, resulting in substantial loss thereof during the scrubbing process. This volatility problem is not unique to unstable diamines but is also encountered with many other diamines which are stable in the presence of $CO_2$ and are effective in enhancing the rate of $CO_2$ scrubbing.

SUMMARY OF THE INVENTION

It has now been discovered that a certain family of non-sterically hindered diaminoalcohol compounds containing at least one hydroxyl group and a tertiary amino group separated by four methylene groups from a primary amino group are stable in the presence of a $CO_2$ and $H_2S$ gaseous mixture, are nonvolatile, and, together with an amino acid cosolvent, form a soluble amino activator system which perform effectively in hot carbonate scrubbing operations. This discovery is unexpected since closely analogous diaminoalcohols having three methylene groups between the amino groups were found to be unstable in the presence of $CO_2$ and $H_2S$.

In one embodiment of the present invention there is provided a process for the removal of $CO_2$ from a gaseous stream containing $CO_2$ which comprises (1) in an absorption step, absorbing $CO_2$ from said gaseous stream with an aqueous absorbing solution comprising (a) a basic alkali metal salt or hydroxide selected from the group consisting of alkali metal bicarbonates, carbonates, hydroxides, borates, phosphates and their mixtures, and (b) an activator or promoter system for said basic alkali metal salt or hydroxide comprising (i) at least one diaminoalcohol of the following general formula:

$$H_2N-(CH_2)_4-NRR'$$

wherein R and R' each independently represent a $C_1$–$C_6$ alkyl group and either R or R' or both R and R' have a terminal or pendant hydroxyl group, and (ii) an amino acid which has the capability to increase the solubility of said diaminoalcohols in alkaline aqueous conditions at elevated temperatures, and (2) in a desorption and regeneration step, desorbing at least a portion of the absorbed $CO_2$ from said absorbing solution.

As another embodiment of the invention there is provided an aqueous acid gas scrubbing composition comprising: (a) 10 to about 40% by weight of an alkali metal salt or hydroxide, (b) 2 to about 20% by weight of a diaminoalcohol of the formula given above, (c) 2 to about 20% by weight of an amino acid which has the capability to increase the solubility of the diaminoalcohols in alkaline aqueous conditions at elevated temperatures, and (d) the balance, water.

The mole ratio of diaminoalcohol to amino acid may vary widely but is preferably 1:3 to 3:1, most preferably 1:1. The amino acid may be added to the scrubbing solution containing the diaminoalcohol all at once or in increments during the gas scrubbing operation.

The non-sterically hindered diaminoalcohol compound herein may be any compound which is water soluble in the presence of the amino acid co-promoter and has at least one hydroxyl group and a tertiary amino group separated by four methylene groups from a primary amino group, as represented by the formula given above. Typical such diaminoalcohols include N-(2-hydroxyethyl)-N-(n-propyl)-1,4-butanediamine, N-(2-hydroxyethyl)-N-(isopentyl)-1,4-butanediamine, N,N-di(2-hydroxyethyl)-1,4-butanediamine, N-(2-hydroxypropyl)-N-methyl-1,4-butanediamine, and the like. The preferred diaminoalcohols herein are those containing only one hydroxyl group, and most preferred is N-(2-hydroxyethyl)-N-(n-propyl)-1,4-butanediamine.

The amino acids herein include any amino acids which are soluble in the alkaline aqueous solution to be used in the acid gas treating solution. Preferably, the amino acid will have 4 to 8 carbon atoms and one amino moiety and will be free of any hydroxyl group. Especially preferred within this category are tertiary amino acids, defined as amino acids wherein the amino moiety is a tertiary amino moiety such as N,N-dimethyl glycine and N,N-diethyl glycine. Also especially preferred are sterically hindered amino acids of 4 to 8 carbon atoms defined as those containing at least one secondary amino moiety attached to either a secondary or tertiary carbon atom or a primary amino moiety attached to a tertiary carbon atom. At least one of the nitrogen atoms will have a sterically hindered structure. Typical sterically hindered amino acids useful in the practice of the present invention will include N-secondary butyl glycine, pipecolinic acid, N-isopropyl glycine, N-2-amyl glycine, N-isopropyl alanine, N-secondary butyl alanine, 2-amino-2-methyl butyric acid, and 2-amino-2-methyl valeric acid.

In general, the aqueous scrubbing solution will comprise an alkaline material comprising a basic alkali metal salt or alkali metal hydroxide selected from Group IA of the Periodic Table of Elements. More preferably, the alkali metal salt or hydroxide in the scrubbing solution is potassium or sodium borate, carbonate, hydroxide, phosphate, or bicarbonate, or mixtures thereof. Most preferably, the alkaline material is potassium carbonate.

The alkaline material comprising the basic alkali metal or salt or alkali metal hydroxide may be present in the scrubbing solution in the range from about 10% to about 40% by weight, preferably from 20% to about 35% by weight. The actual amount of alkaline material chosen will be such that the alkaline material and the amino acid activator or promoter system remain in solution throughout the entire cycle of absorption of $CO_2$ from the gas stream and desorption of $CO_2$ from the solution in the regeneration step. Likewise, the amount and mole ratio of the amino acid to the diaminoalcohol is maintained such that they remain in solution as a single phase throughout the absorption and regeneration steps. Typically, these criteria are met by including from about 2 to about 20% by weight of the amino acid, preferably from 5 to 15% by weight, more preferably, 5 to 10% by weight of the amino acid and from 2 to about 20% by weight, preferably, 5 to about 15% by weight of the diaminoalcohol.

The aqueous scrubbing solution may include a variety of additives typically used in acid gas scrubbing processes, e.g., antifoaming agents, antioxidants, corrosion inhibitors and the like. The amount of these additives will typically be in the range that they are effective, i.e., an effective amount.

DESCRIPTION OF THE PREFERRED EMBODIMENTS

The term acid gas includes $CO_2$ alone or in combination with $H_2S$, $CS_2$, HCN, COS and the oxides and sulfur derivatives of $C_1$ to $C_4$ hydrocarbons. These acid gases may be present in trace amounts within a gaseous mixture or in major proportions.

The contacting of the absorbent mixture and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psia, preferably 100 to 1500 psia, and most preferably 200 to 1000 psia in the absorber. In the desorber, the pressures will range from about 5 to 100 psig. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption, the solution is maintained in a single phase. The amino acid aids in reducing foam in the contacting vessels.

The aqueous absorption solution comprising the alkaline material and the activator system of diaminoalcohol and amino acid which is saturated or partially saturated with gases, such as $CO_2$ and $H_2S$, may be regenerated so that it may be recycled back to the absorber. The regeneration should also take place in a single liquid phase. Therefore, the presence of a highly water-soluble amino acid as cosolvent provides an advantage in this part of the overall acid gas scrubbing process. The regeneration or desorption in accomplished by conventional means, such as pressure reduction, which causes the acid gases to flash off by passing the solution into a tower of similar construction to that used in the absorption step, at or near the top of the tower, and passing an inert gas such as air or nitrogen or preferably steam up the tower. The temperature of the solution during the regeneration step may be the same as used in the absorption step, i.e., 25° to about 200° C., and preferably 35° to about 150° C. The absorbing solution, after being cleansed of at least a portion of the acid bodies, may be recycled back to the absorbing tower. Makeup absorbent may be added as needed. Single phase is maintained during desorption by controlling the acid gas, e.g., $CO_2$, level so that it does not fall into the region where two liquid phases form. This, of course, following the practice of the present invention, is facilitated by the use of a highly water soluble amino acid in the mixture.

As a typical example, during desorption, the acid gas (e.g., $CO_2$) - rich solution from the high pressure absorber is sent first to a flash chamber where steam and some $CO_2$ are flashed from solution at low pressure. The amount of $CO_2$ flashed off will, in general, be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to 25 psia stripper pressures, the temperature will preferably be about 100° to about 140° C. during desorption. Single phase is maintained during desorption by regulating the amount of acid gas, e.g., $CO_2$, recovered.

In the most preferred embodiment of the present invention, the acid gas, e.g., $CO_2$ is removed from a gaseous stream by means of a process which comprises, in sequential steps, (1) contacting the gaseous stream with a solution comprising 10 to about 40 weight percent, preferably 20 to about 30 weight percent of potassium carbonate, an activator or promoter system comprising 2 to about 20 weight percent, preferably 5 to about 15 weight percent, of the diaminoalcohol as herein defined, and 2 to about 20 weight percent, preferably 5 to about 15 weight percent, more preferably 5 to about 10 weight percent, of the amino acid as herein defined, the balance of said solution being comprised of water, said contacting being conducted at conditions whereby the acid gas is absorbed in said solution, and preferably at a temperature ranging from 25° to about 200° C., more preferably from 35° to about 150° C. and a pressure ranging from 100 to about 1500 psia, and (2) regenerating said solution at conditions whereby said acid gas is desorbed from said solution. By practicing the present invention, one can operate the process above described at conditions whereby the working capacity, which is the difference in moles of acid gas absorbed in the solution at the termination of steps (1) and (2) based on the moles of potassium carbonate originally present, is comparable to that obtained under the same operating conditions for removing acid gases from gaseous streams, wherein sterically hindered diamines or diaminoalcohols with fewer methylene groups between the amino groups are employed with an amino acid cosolvent. In other words, working capacity is defined as follows:

$$\begin{array}{c} CO_2 \text{ in solution} \\ \text{at completion of} \\ \text{absorption} \end{array} \text{ less } \begin{array}{c} CO_2 \text{ in solution} \\ \text{at completion of} \\ \text{desorption} \end{array}$$

Which is:

$$\frac{\text{Moles of } CO_2 \text{ Absorbed}}{\text{Initial Moles } K_2CO_3} \text{ less } \frac{\text{Moles Residual } CO_2 \text{ Absorbed}}{\text{Initial Moles } K_2CO_3}$$

It should be noted that throughout the specification wherein working capacity is referred to, the term may be defined as the difference between $CO_2$ loading in solution at absorption conditions (step 1) and the $CO_2$ loading in solution at regeneration conditions (step 2) each divided by the initial moles of potassium carbonate. The working capacity is equivalent to the thermodynamic cyclic capacity, that is, the loading is measured at equilibrium conditions. This working capacity may be obtained from the vapor-liquid equilibrium isotherm, that is, from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$, absorption pressure, (2) acid gas, e.g., $CO_2$, regeneration pressure, (3) temperature of absorption, (4) temperature of regeneration, (5) solution composition, that is, weight percent amino acid, weight percent diaminoalcohol and weight percent of the alkaline salt or hydroxide, for example potassium carbonate, and (6) gas composition.

Besides providing working capacity and rates of absorption and desorption which are comparable to that of the sterically hindered diamines and other diaminoalcohols useful for this purpose, the specific class of diaminoalcohols herein have lower volatility than many sterically hindered diamines and have increased stability in the presence of $CO_2$ gas.

Steam requirements are the major part of the energy cost of operating an acid gas, e.g., $CO_2$ scrubbing unit. Substantial reduction in energy, i.e., operating costs will be obtained by the use of the process wherein the mixture is utilized. Additional savings from new plant investment reduction and debottlenecking of existing plants may also be obtained by the use of the mixture of the invention. The removal of acid gases such as $CO_2$ from gas mixtures is of major industrial importance, particularly the systems which utilize potassium carbonate activated by the unique activator or promoter system of the present invention.

While the sterically hindered amines, as shown in U.S. Pat. No. 4,112,050, provide unique benefits in their ability to improve the working capacity in the acid scrubbing process, their efficiency may decrease in alkaline "hot pot" (hot potassium carbonate) scrubbing systems at high temperatures and at low concentrations of the acid gas due to phase separation. Therefore, full advantage of the highly effective sterically hindered amines cannot always be utilized at these operating conditions. The addition of an amino acid, as a cosolvent, as shown in U.S. Pat. No. 4,094,957, solves the problem of phase separation and enables a more complete utilization of sterically hindered amines as the alkaline materials activator or promoter. This result was unexpected for the reason that many sterically hindered amino acids (including the sterically hindered amino acid, pipecolinic acid) alone, while soluble in these alkaline systems, are not as effective as activators in acid gas scrubbing processes as the other sterically hindered amino compounds. The specific admixture, as instantly claimed and disclosed, while not employing a sterically hindered diamino compound, provides the same working capacity and/or rates of $CO_2$ absorption as those previously reported in U.S. Pat. No. 4,094,957, particularly the N-cyclohexyl 1,3-propanediamine and pipecolinic acid promoter system.

The absorbing solution of the present invention, as described above, will be comprised of a major proportion of the alkaline materials, e.g., alkali metal salts of hydroxides and a minor proportion of the amine activator system. The remainder of the solution will be comprised of water and/or other commonly used additives, such as anti-foaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

Representative non-sterically hindered diaminoalcohol compounds for use in the present invention include: N-(2-hydroxyethyl)-N-(n-propyl)-1,4-butanediamine, N-(2-hydroxyethyl)-N-(isopentyl)-1,4-butanediamine, N,N-di(2-hydroxyethyl)-1,4-butanediamine, N-(2-hydroxypropyl)-N-methyl-1,4-butanediamine, and the like.

Many of the amino acids useful in the practice of the present invention are either available commercially or may be prepared by various known procedures. Representative amino acids applicable herein include: N,N-diethyl glycine, N,N-dimethyl glycine, pipecolinic acid, N-secondary butyl glycine, N-2-amyl glycine, N-isopropyl glycine, N-secondary butyl-alpha-alanine, 2-amino-2-methyl butyric acid, and 2-amino-2-methyl valeric acid. Particularly preferred for use herein are pipecolinic acid and N-secondary butyl glycine.

The invention is illustrated further by the following examples which, however, are not to be taken as limiting in any respect. All parts and percentages, unless expressly stated to be otherwise, are by weight.

EXAMPLE 1 bility of CHPD (the preferred sterically hindered diamine in U.S. Pat. Nos. 4,094,957 and 4,112,050).

TABLE I

| Amine* | Capacity (liters of $CO_2$ reabsorbed) | Time (min:sec) to absorb indicated volume of $CO_2$ | | | Lean Solubility |
|---|---|---|---|---|---|
| | | 10 l | 15 l | 20 l | |
| N—cyclohexyl propanediamine** | 30.0 | 0:53 | 1:30 | 2:21 | one phase |
| N—(n-propyl)-N—(2-hydroxyethyl)-1,3 propanediamine** | 31.6 | 0:51 | 1:25 | 2:08 | one phase |
| N—(n-butyl)-N—(2-hydroxyethyl)-1,3-propanediamine** | 32.7 | 0:56 | 1:35 | 2:19 | one phase |
| N—(n-propyl)-N—(2-hydroxyethyl)-1,4-butanediamine | 31.8 | 0:50 | 1:30 | 2:30 | one phase |

*In combination with pipecolinic acid
**Controls

The reaction apparatus consists of an absorber and a desorber as shown in FIG. 1 of U.S. Pat. No. 4,112,050 incorporated herein by reference. The absorber is a vessel having a capacity of 2.5 liters and a diameter of 10 cm, equipped with a heating jacket and a stirrer. A pump removes liquid from the bottom of the reactor and feeds it back to above the liquid level through a stainless-steel sparger. Nitrogen and $CO_2$ can be fed to the bottom of the cell through a sparger.

The desorber is a 1-liter reactor, equipped with teflon blade stirrer, gas sparger, reflux condenser and thermometer.

The following reagents were put into a 2-liter Erlenmeyer flask:
  0.35 mole of the amine indicated in Table 1
  0.17 mole of pipecolinic acid
  225 g of $K_2CO_3$
  water to make 750 g total solution When all solids had dissolved, the mixture was put into the absorber and brought to 80° C. The apparatus was closed and evacuated until the liquid began to boil. At this point $CO_2$ gas was admitted. At the end of the absorption the rich solution was transferred to the desorber and boiled for one hour to desorb the $CO_2$ gas.

The regenerated solution so obtained was transferred back to the absorber and cooled to 80° C. The apparatus was closed and evacuated until the liquid began to boil. At this point $CO_2$ gas was admitted. The amount of time taken for the solution to reabsorb 10, 15 and 20 l of $CO_2$ gas was measured, as well as the total amount of $CO_2$ gas reabsorbed in the process, designated as capacity to reabsorb.

The rich solution containing $K_2CO_3$, amine and amino acid was regenerated by boiling for an hour, and then was used for a phase-behavior study.

About 600 g of regenerated solution were charged into a 1-liter autoclave equipped with Herculite (trademark) window, reflux condenser and inlet and outlet for gases. The autoclave was brought to 121° C. while blowing a mixture containing 0.2% $CO_2$ gas and 99.8% He gas at about 0.2 liters/minute. When the outgoing gas had the same composition as the entering gas, equilibrium was reached. Only one phase was present in each case.

When the experiment was repeated, replacing pipecolinic acid with water, two liquid phases were present at equilibrium.

From the results of these tests, shown in Table 1, it can be seen that the rates of absorption and the solubilities of all non-sterically hindered diaminoalcohols tested were comparable to the absorption rate and solubility of CHPD (the preferred sterically hindered diamine in U.S. Pat. Nos. 4,094,957 and 4,112,050).

EXAMPLE 2

The following experiments were carried out to ascertain the stability of the diaminoalcohols herein under accelerated-simulated acid gas treating conditions.

Five standard lean solutions were prepared with the following ingredients:
  7.4% by weight of the amine indicated in Table II
  3.0% by weight of pipecolinic acid
  26.1% by weight of $KHCO_3$*
  3.9% by weight of $K_2S$**
  59.6% by weight of water

*represents 87% replacement of 30% $K_2CO_3$ in solution with $KHCO_3$ to simulate presence of $CO_2$ gas.
**represents 13% replacement of 30% $K_2CO_3$ in solution with $K_2S$ to simulate presence of $H_2S$ gas.

A total of 5.4 g of each of these solutions was charged separately into five 10-ml, stainless-steel ampoules, which were each flushed with nitrogen gas and sealed. All of the ampoules were then immersed simultaneously into an oil bath at 140° C. and monitored each day by means of gas chromatographic analysis for the amount of original amine remaining in solution. Higher amounts of amine indicate less conversion to by-products and thus greater stability as well as non-volatility at temperatures of 140° C. The results are given in Table II.

TABLE II

| Amine | Days at 140° C. | % of Original Amine Remaining |
|---|---|---|
| CHPD* | 7 | <10 |
| N—(n-propyl)-N—(2-hydroxyethyl)-1,3-propanediamine* | 7 | <8 |
| N—(n-propyl)-N—(2-hydroxypropyl)-1,3-propanediamine* | 2 | 66 |
| | 5 | 44 |
| | 12 | 16 |
| N—(n-propyl)-N—(3-hydroxypropyl)-1,3-propanediamine* | 2 | 20 |
| | 5 | 9 |
| N—(n-propyl)-N—(2-hydroxyethyl)-1,4-butanediamine | 2 | 80 |
| | 5 | 73 |
| | 12 | 59 |

*Controls

It can be seen that the diaminoalcohol of this invention, represented by the fifth amine in this table, exhibited superior stability as compared not only with CHPD, but also with homologous diaminoalcohols.

In summary, the present invention is seen to provide a class of non-sterically hindered diaminoalcohols which not only perform effectively in acid gas scrubbing processes but are also relatively non-volatile and stable to the acid gases present in the system.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of $CO_2$ from a gaseous stream containing $CO_2$ which comprises (1) in an absorption step, absorbing $CO_2$ from said gaseous stream with an aqueous absorbing solution comprising (a) a basic alkali metal salt or hydroxide selected from the group consisting of alkali metal bicarbonates, carbonates, hydroxides, borates, phosphates and their mixtures, and (b) an activator or promoter system for said basic alkali metal salt or hydroxide comprising (i) at least one diaminoalcohol of the following general formula:

$$H_2N-(CH_2)_4-NRR'$$

wherein R and R' each independently represent a $C_1$–$C_6$ alkyl group and either R or R' or both R and R' have a terminal or pendant hydroxyl group and (ii) an amino acid which has the capability to increase the solubility of said diaminoalcohols in alkaline aqueous conditions at elevated temperatures, and (2) in a desorption and regeneration step, desorbing at least a portion of the absorbed $CO_2$ from said absorbing solution.

2. The process of claim 1 wherein said amino acid has 4 to 8 carbon atoms and is free of any hydroxyl groups, and is either a tertiary amino acid wherein the amino moiety is a tertiary amino moiety, or a sterically hindered amino acid containing at least one secondary amino moiety attached to either a secondary or tertiary carbon atom or a primary amino moiety attached to a tertiary carbon atom.

3. The process of claim 1 wherein said amino acid is pipecolinic acid or N-secondary butyl glycine.

4. The process of claim 1 wherein said basic alkali metal salt or hydroxide is potassium carbonate.

5. The process of claim 1 wherein the aqueous solution contains 10 to about 40% by weight of said basic alkali metal salt or hydroxide.

6. The process of claim 1 wherein the aqueous solution contains 2 to about 20% by weight of said diaminoalcohol and 2 to about 20% by weight of said amino acid.

7. The process of claim 1 wherein said diaminoalcohol contains only one hydroxyl group.

8. The process of claim 1 wherein said diaminoalcohol is N-(2-hydroxyethyl)-N-(n-propyl)-1,4-butanediamine.

9. The process of claim 1 wherein the temperature of the absorbing solution during the absorption step is in the range of from about 25° to about 200° C., the pressure in the absorber ranges from about 5 to about 2000 psia, and the partial pressure of the acid gas components in the feed steam ranges from about 0.1 to about 500 psia.

10. The process of claim 9 wherein the temperature of the absorbing solution during the regeneration step is in the range from about 25° to about 200° C. and at pressures ranging from about 16 to about 100 psia.

11. The process of claim 1 wherein the absorbing solution additionally includes additives selected from the group consisting of antifoaming agents, antioxidants and corrosion inhibitors.

12. A process for the removal of $CO_2$ from a gaseous stream containing $CO_2$ which comprises, in sequential steps, (1) contacting the gaseous stream with an absorbing solution comprising (a) from about 20 to about 30 weight percent of potassium carbonate and (b) an activator or promoter system for the potassium carbonate comprising (i) from about 5 to about 15 weight percent of at least one diaminoalcohol of the formula:

$$H_2N-(CH_2)_4-NRR'$$

wherein R and R' each independently represent a $C_1$–$C_6$ alkyl group and either R or R' has a terminal or pendant hydroxyl group, and (ii) from about 5 to about 10 weight percent of pipecolinic acid or N-secondary butyl glycine, and (c) the balance of said absorbing solution being comprised of water and additives selected from the group consisting of antifoaming agents, antioxidants and corrosion inhibitors, wherein said contacting is conducted at conditions whereby $CO_2$ is absorbed in said absorbing solution and the temperature of the absorbing solution is in the range from about 35° to about 150° C., and the pressure in the absorber is in the range from about 100 to about 1500 psia; and (2) regenerating said absorbing solution at conditions whereby $CO_2$ is desorbed from said absorbing solution, wherein the regeneration takes place at temperatures ranging from about 35° to about 150° C. and at pressures ranging from about 5 to about 100 psig.

13. The process of claim 12 wherein the absorbing solution from the regeneration step is recycled for reuse in the absorption step.

14. An aqueous acid gas scrubbing composition comprising: (a) 10 to about 40% by weight of an alkali metal salt or hydroxide, (b) 2 to about 20% by weight of a diaminoalcohol of the following general formula:

$$H_2N-(CH_2)_4-NRR'$$

wherein R and R' each independently represent a $C_1$–$C_6$ alkyl group and either R or R' or both R and R' have a terminal or pendant hydroxyl group, (c) 2 to about 20% by weight of an amino acid which has the capability to increase the solubility of said diaminoalcohols in alkaline aqueous conditions at elevated temperatures, and (d) the balance, water.

15. An aqueous acid gas scrubbing composition comprising: (a) 20 to 30% by weight of potassium carbonate, (b) 5 to about 15% by weight of N-(2-hydroxyethyl)-N-(n-propyl)-1,4-butanediamine, (c) 5 to about 10% by weight of pipecolinic acid, and (d) the balance, water.

* * * * *